(12) United States Patent
Gordon

(10) Patent No.: US 7,841,359 B2
(45) Date of Patent: Nov. 30, 2010

(54) CHECK VALVE

(76) Inventor: Larry R. Gordon, 19631 E. Camina Plata, Queen Creek, AZ (US) 85242

( * ) Notice: Subject to any disclaimer, the term of this patent is extended or adjusted under 35 U.S.C. 154(b) by 359 days.

(21) Appl. No.: 11/825,022

(22) Filed: Jul. 3, 2007

(65) Prior Publication Data
US 2009/0008591 A1 Jan. 8, 2009

(51) Int. Cl.
*F16K 15/06* (2006.01)
(52) U.S. Cl. ............... 137/533.31; 137/516.25
(58) Field of Classification Search ........... 137/533.25, 137/533.31, 533, 516.25, 534
See application file for complete search history.

(56) References Cited

U.S. PATENT DOCUMENTS

| 442,284 A | * | 12/1890 | Craig et al. ............ 137/533.25 |
| 1,072,673 A | * | 9/1913 | Thelen ................ 137/533.25 |
| 1,776,060 A | * | 9/1930 | Beckwith ............... 137/516.27 |
| 3,958,603 A | * | 5/1976 | Bannon et al. ................ 138/43 |
| 5,819,785 A | * | 10/1998 | Bardini ....................... 137/337 |

* cited by examiner

*Primary Examiner*—Stephen Hepperle
*Assistant Examiner*—Macade Brown
(74) *Attorney, Agent, or Firm*—Tod R. Nissle, P.C.

(57) ABSTRACT

A check valve assembly with an extended operational life. The check valve assembly includes a poppet with conically shaped arms and planar seating surfaces. The planar seating surfaces conform to seating surfaces in the valve assembly. The poppet moves back and forth between two operative positions. In each operative position, a planar seating surface on the poppet sealingly conforms to another planar sealing surface in the check valve assembly. The use of planar seating surfaces extends the operational life of the check valve assembly. The aerodynamic shape of the conically shaped arms facilitates fluid flow over the poppet and, when fluid flows over the poppet, generates forces that function to minimize movement of the poppet and to maintain the poppet in a desired orientation when the poppet moves from one operative position to another operative position.

1 Claim, 3 Drawing Sheets

*FIG. 3*
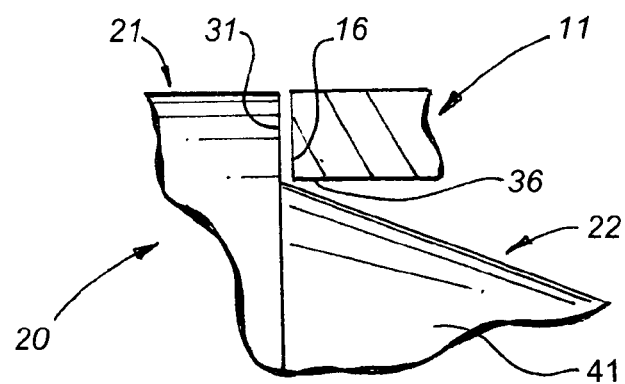
*FIG. 4*
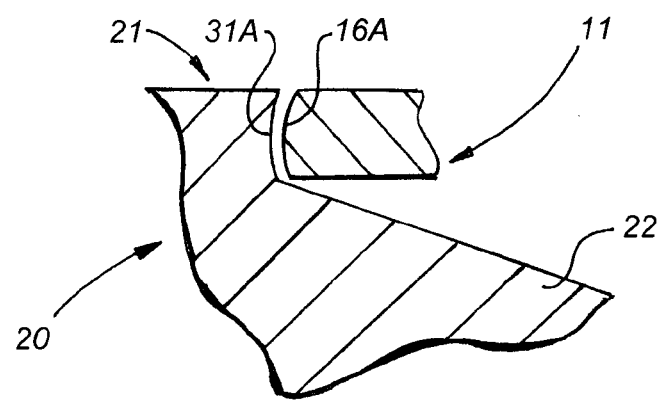
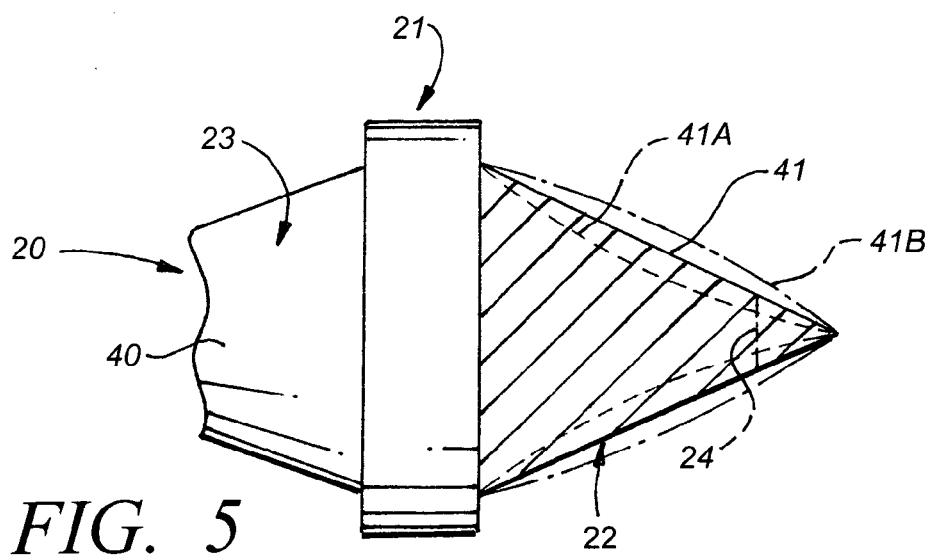
*FIG. 5*

CHECK VALUE

This invention pertain to check valves.

More particularly, the invention pertains to an extended life check valve in which the poppet is stable when the valve is open, which permits relatively large debris to pass through the valve when the valve is open, and which produces only a small pressure drop when a fluid flows through the valve.

Many check valves utilize a poppet which moves continuously or in an unstable manner water or another liquid or a gas flows through the valve. This causes the poppet and other moving parts to wear and shortens the life of the check valve. Other check valve designs become jammed by debris in one position or another, which renders the check valve inoperable.

Accordingly, it would be highly desirable to produce an improved check valve that has an extended life, minimizes the pressure drop that occurs at the valve, and facilitates the passage of debris through the valve while minimizing the likelihood that the valve will become jammed.

Therefore, it is a principal object of the invention to provide an improved check valve.

These and other, further and more specific objects and advantages of the invention will be apparent to those skilled in the art from the following detailed description thereof, taken in conjunction with the drawings, in which:

FIG. 3 is a partial side section view of a portion of the check valve of FIGS. 1 and 2 illustrating conforming, opposing, planar, seating surfaces in the valve;

FIG. 4 is a partial side section view of a portion of the check valve of FIGS. 1 and 2 illustrating alternate conforming, opposing, planar seating surfaces in the valve; and, FIG. 5 is partial side section view of the poppet in the check valve of FIGS. 1 and 2 illustrating alternate conical surfaces that can be utilized on the outwardly extending arms of the poppet.

Briefly, in accordance with the invention, provided is an improved check valve assembly including a housing; an outlet conduit extending into the housing and having an end with a first seating surface; at least one outflow aperture formed in the conduit within the housing; an inlet conduit connected to the housing and including a second seating surface within the housing and spaced apart from the first seating surface; a poppet mounted in the housing and including a third seating surface and a fourth seating surface. The poppet moves between at least two operative positions, a first operative open position with the third seating surface sealingly contacting the first seating surface to permit fluid flowing into the housing from the inlet conduit to flow around the poppet, into the outflow aperture, and outwardly through the outlet conduit; and, a second operative position with the seating surface sealingly contacting the cond seating surface to prevent fluid from back flowing from the housing into the inlet conduit.

In another embodiment of the invention, provided is an improved check valve assembly. The check valve assembly includes a housing including an arcuate inner surface having a width; an outlet conduit extending into the housing and having an end with a first planar seating surface, and an inner diameter less than the width of the housing; at least one outflow aperture formed in the conduit within the housing; an inlet conduit connected to the housing and having an end with a second planar seating surface spaced apart from the first seating surface, and an inner diameter less than the width of the housing; and, a poppet mounted in the housing. The poppet includes a body including a first side with a third planar seating surface shaped to conform to the first seating surface, and a second side with a fourth planar seating surface shaped to conform to the second seating surface; a first arm extending outwardly from the first side and having a substantially conical outer surface; and, a second arm extending outwardly from the second side and having a substantially conical outer surface. The poppet moves between at least two operative positions, a first operative open position with the third seating surface sealingly contacting the first seating surface to permit fluid flowing into the housing from the inlet conduit to flow around the poppet, into the outflow aperture, and outwardly through the outlet conduit, and a second operative position with the fourth seating surface sealingly contacting the second seating surface to prevent fluid from back flowing from the housing into the inlet conduit.

Figure 1:
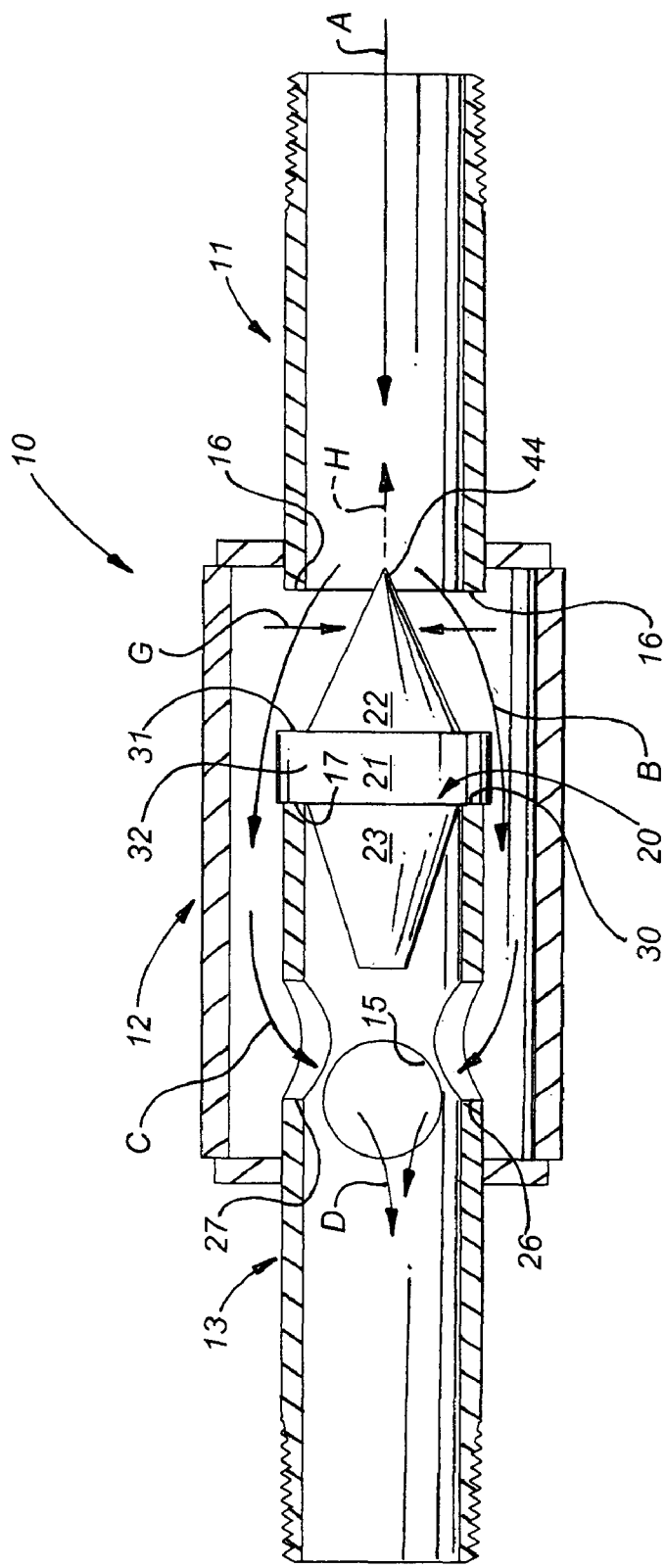
FIG. 1 is a section view illustrating the check valve of the invention when the valve is open and water is flowing therethrough.
Figure 2:
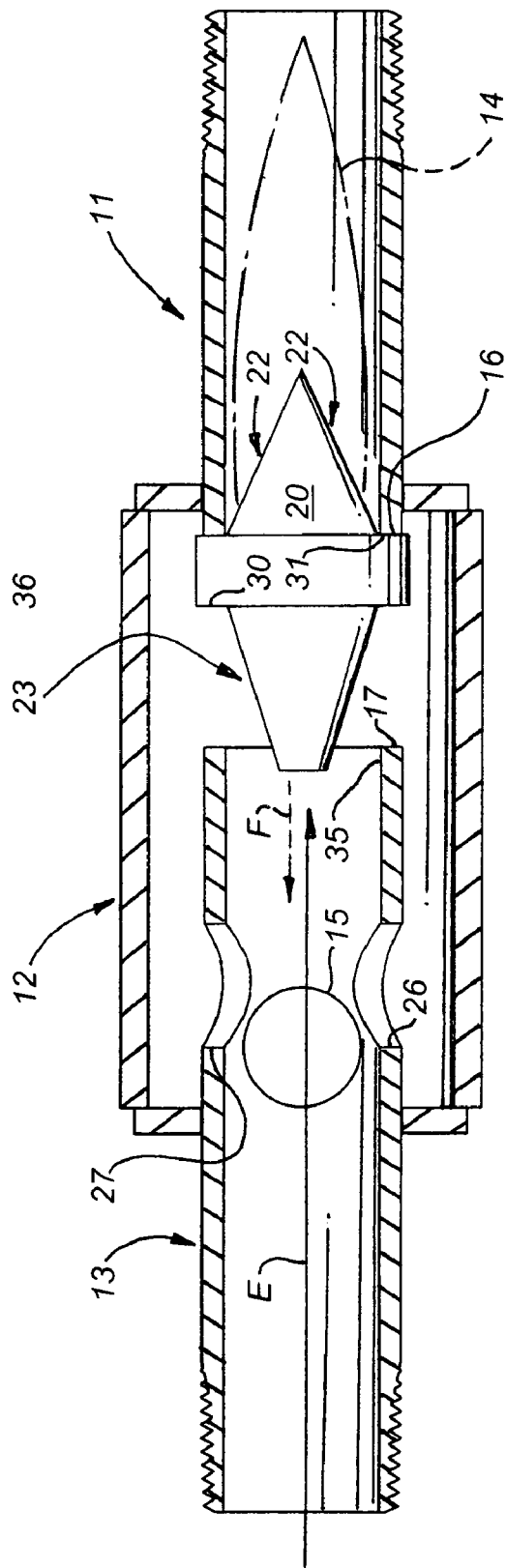
FIG. 2 is a section view illustrating the check valve of the invention when the valve is closed and water is prevented from flowing back through the valve when back pressure is generated.

Turning now to the drawings, which depict the presently preferred embodiments of the invention for the purpose of illustrating the practice thereof and not by way of limitation of the scope of the invention, and in which like characters refer to corresponding elements throughout the several views, FIGS. 1 and 2 illustrate a check valve 10 constructed in accordance with the invention and including a cylindrical housing 12, a cylindrical inlet conduit 11, a cylindrical outlet conduit 13, and a poppet 20. The width of housing 12 is the equal to the dimension of the widest inner portion of the housing 12. Since housing 12 is cylindrical, the width of housing 12 is equivalent in all directions, i.e., the width of housing 12 equals the inner diameter of housing 12. The shape and dimension of housing 12 can vary as desired.

The inlet conduit 11 includes a circular flat planar seating surface or lip 16 at the end of conduit 11. Water or another fluid flows from conduit 11 into housing 12 in the manner indicated by arrows A and B in FIG. 1. The inner wall of conduit 11 includes a conical screen 10.

The outlet conduit 13 extends into housing 12 and includes at least one aperture 15, 26, 27 located within housing 12 to receive water or another fluid flowing out of housing 12 into conduit 13 in the manner indicated by arrows C and D in FIG. 1. Outlet conduit 13 also includes a circular flat planar seating surface or lip 17 at one end of conduit 13.

Poppet 20 includes tapered conically shaped outer guide surfaces or arms 22, 23 each depending and tapering outwardly from a different side of a cylindrically shaped body 20. Each arm 22, 23 has a substantially conical outer surface 41, 40, respectively (FIG. 5). As used herein, a substantially conical outer surface means a tapered, arcuate surface. For example, in FIG. 5, outer surface 41 comprises an outer surface normally associated with a cone. Surface 41 is a substantially conical outer surface. Surface 41A in FIG. 5 generally defines a cone shape, but is, in comparison to surface 41, somewhat concave. Surface 41A is a substantially conical outer surface. Surface 41B in FIG. 5 generally defines a cone shape, but is, in comparison to surface 41, somewhat convex and "bulges" outwardly. Surface 41B is a substantially conical outer surface.

Cylindrical body 20 includes a first circular flat planar seating surface 31 shaped and dimensioned to conform to and seat on surface 16, includes outer arcuate cylindrical surface 32, and includes a second circular flat seating surface 30 shaped and dimensioned to conform to and seat on surface 17. Seating surfaces 30 and 31 extend inwardly from and are normal to outer curved cylindrical surface 32. Arm 22 includes pointed tip 44 (FIG. 1), but can if desired have, instead of tip, flat circular end surface 24 (FIG. 5). Arm 23 includes flat circular end surface 32 (FIG. 2).

As utilized herein, a planar surface is not an edge and has a width greater than an edge. A planar surface can be flat, as are the circular planar seating surfaces 30 and 31 that each circumscribe the base of arms 23 and 22, respectively. A planar surface can be arcuate. The outer surface of a cylinder is planar. Surface 41 is planar. Consequently, in FIG. 4 arcuate seating surface 31A is planar, as is the opposing conforming seating surface 16A formed on the end of conduit 11. Arcuate seating surface 31A circumscribes the base of conically shaped arm 22. Arcuate planar seating surface 16A circumscribes the end of conduit 11. Similarly, in FIG. 3, opposing, conforming seating surfaces 16 and 31 are planar.

Continuous Outer Surface

Exterior surfaces 24, 32, 22, 23, 21, 30, 31 of poppet 20 are interconnected to form a continuous outer surfaces such that when the valve is open in the manner indicated in FIG. 1, water or another fluid flows over and around surfaces 24, 32, 33, 23, 21, 30, 31 and does not flow through poppet 20. While one or more openings can, if desired, be formed in poppet 20 so that water flows through such openings, such construction is not presently preferred in the practice of the invention.

Avoidance of Spherical Shape

Importantly, poppet 20 is not spherically shaped. A ball-shaped poppet tends to constantly move and "dance" around, causing the poppet to strike continuously seating surfaces or other surfaces in a check valve. This is believed to contribute significantly to the wear, and eventual failure, of a check valve, particularly when a spherical poppet seats against a circular edge.

Avoidance of Edges as Seating Surfaces

The seating surfaces 16, 17, 30, 31 utilized in check valve 10 are flat, planar surfaces having a selected width. It would be possible for surface 31 to seat against surface 16 that consisted only of a circular knife edge instead of the circular flat, planar seating surfaces noted in FIGS. 1 and 2. Knife edge contact surfaces are, however, avoided in the practice of the invention because it is believed they tend to rapidly wear. It is more difficult to seal a spherical poppet, especially if there is an edge contact with the spherical poppet. Sealing with conforming opposing seating surfaces is an important feature of the invention.

Aerodynamically Stable Arms

When water or another fluid flows in the direction of arrows B over arm 22, or in the direction of arrow E over arm 23, the inwardly acting forces, indicated by arrows G in FIG. 1, produced on the conical surfaces of arms 22 and 23 tend to stabilize poppet 20 such that when the poppet moves in the direction of arrow E (FIG. 1) from the open position shown in FIG. 1 to the closed position shown in FIG. 2 (or moves in the direction of arrow F from the closed position shown in FIG. 2 to the open position shown in FIG. 1), the orientation of poppet 20 tends to remain the same such that the poppet 20 does not tilt from the level orientation shown in FIGS. 1 and 2, such that poppet 20 tends to remain centered on and in registration with the circular openings 35 and 36 at the ends of conduits 13 and 11, respectively, and such that poppet 20 tends to move straight from one opening 35 to the other opening 36, or vice-versa. When, for example, fluid flows in the direction of arrows A and B over arm 22, inward forces G are produced that tend to "hold" poppet in the orientation of FIG. 1 and to not permit poppet 20 to fall or move downwardly. The flow of fluid over poppet 20 also produces the "pushing" forces that move poppet 20 from opening 36 to opening 35, or vice-versa.

Specific Gravity of Poppet

Although the specific gravity of poppet 20 can vary as desired, it is preferred that, when practical, the specific gravity of poppet 20 be substantially equal to that of the fluid flowing through the check valve 10, i.e., that the specific gravity of poppet 20 be in the range of 95% to 105% of the specific gravity of water. This is particularly the case when the fluid flowing through valve 10 is water or some aqueous solution. When the specific gravity of poppet 20 is about equal to that of water, and water is flowing through valve 10, the tendency of poppet to rise or fall is minimized, which minimizes wear and tear on the poppet. As can be seen in FIGS. 1 and 2, regardless of the location of poppet 20 in the open or closed position of valve 10, or regardless of whether poppet 20 is moving between the open and closed position, each end 24 (FIG. 1) or 32 (FIG. 2) is positioned in conduit 11 or 13, respectively. This prevents poppet 10 from falling or sinking to a position in which an end 24, 32 is not located in its respective conduit 11, 13. In one embodiment of the invention, poppet 20 is made from nylon or another material that floats in water. Obtaining a material that has a density identical to that of water is, practically speaking, difficult. That is why the density of the poppet is substantially equal to that of water. The poppet currently utilized in the practice of the invention is made from a polymer that is slightly more dense than water Vacuum Effect When valve 10 is open and therefore in the configuration illustrated in FIG. 1, the flow of a fluid in the manner indicated by arrows C and D tends to create a low pressure area in conduit 13 that functions to draw poppet 20 and, consequently, seating surface 30 of poppet 20 against seating surface 17 in a direction opposite that of arrow E. This vacuum effect, along with the base of arm 23 and the forces generated by fluid pushing against arms 22 in the direction of arrows A and B, tends further to secure poppet 20 in the position illustrated in FIG. 1. The diameter of the base of arm 23 is only slightly less than the inner diameter of conduit 13, which tends to keep poppet 20 centered in the end of conduit 13. The lower pressure area in conduit 13 is produced by the increase in fluid velocity that occurs when fluid flows into conduit 13 in the manner indicated by arrows C and D. The inner diameter of housing 12 is greater than the inner diameter circumscribed by sealing surface 16 and than the inner diameter circumscribed by sealing surface 17.

Seating Configuration of Arms 22 and 23

The diameter of the base of each arm 22 and 23 is slightly less than the inner diameter of circular openings 35 and 36 (FIG. 2). The circular base of arm 22 is immediately adjacent and connected to one side of body 21. The circular base of arm 23 is immediately adjacent and connected to the other side of cylindrical body 21 (FIG. 1). Accordingly, when poppet 20 moves from the open position of valve 10 shown in FIG. 1 to the closed position of valve 10 shown in FIG. 2, tapered arm 22 functions to help center poppet 20 with respect to circular opening 36. The flow of water over the conical surfaces of arms 22 and 23 tends to maintain poppet 20 in a "centered" position such that when poppet moves from contact with the end of one conduit 11 to contact with the end of another conduit 13, the poppet moves directly from one conduit to another along a straight line of travel that is substantially parallel to the center lines of conduits 11 and 13. As seating surface 31 approaches seating surface 16 (FIG. 1), at least a portion of the base of arm 22 can, if necessary, contact the peripheral edge of circular opening 36 and effectively center poppet 20 with respect to opening 36 such that poppet 20 is in the position depicted in FIG. 2. Similarly, when poppet 20 is in the position shown in FIG. 2, and the flow of fluid through conduit in the direction of arrow A is resumed or initiated and poppet moves to the position illustrated in FIG. 1, the base of arm 23 facilitates centering poppet 20 in the position illustrated in FIG. 1. It is important, however, to note again that the aerodynamic shape of arms 22 and 23 promotes the displacement of poppet 20 "straight across" from the position in FIG. 1 to the position in FIG. 2, which means that the poppet 20 remains centered while it moves back and forth from contact with seating edge 16 and seating edge 17. As a result, the centering action performed by the base of arm 22 or 23, as the case may be, may be negligible or not required. If necessary, when poppet 20 is moving from the position of FIG. 1 to the position of FIG. 2, or vice-versa, a portion of the outer conical surface of an arm 22 or 23 can, during the centering action performed by an arm 22 or 23, contact and slide over the inner peripheral edge circumscribing an opening 36 or 35. The inward forces indicated by arrow G and generated by fluid moving over the outer conical surfaces of arms 22 and 23 minimize and substantially eliminate any up and down or side to side movement of poppet 20 when poppet 20 is in the positions illustrated in FIGS. 1 and 2 and when poppet 20 is moving from the position of FIG. 1 to the position illustrated in FIG. 2. Poppet 20 moves from the position of FIG. 1 to the position of FIG. 2 when fluid flow in the direction of arrow A is discontinued, and back pressure is generated and fluid attempts to back flow through housing 12 and conduit 11 in a direction directly opposite that of arrow A and indicated by arrow E (FIG. 1).

The flow of water in the direction of arrow A (FIG. 1) into conduit 11 and valve 10 can be generated by a submersible pump or any other type of pump or fluid flow generating apparatus. Conduit 13 can be connected to and deliver water to a high pressure manifold or any other desired device.

The size of valve 10 can vary as desired, but by way of example, the scale of the drawings in FIGS. 1 and 2 is 1:1.

The check valve of the invention tends to be self-correcting, or self-cleaning. If debris catches on poppet 20 or another portion of the valve, during the next cycle of operation of the valve (i.e., normal flow through ceases, back pressure is generated, and normal flow through is then re-established) the debris tends to flush through the valve.

The poppet 20 utilized in the invention is guided substantially by water flow. Although poppet 20 does, as described above, move back-and-forth between and contact a pair of open conduit ends, other auxiliary slide surfaces, dowels, or other mechanical guide members or apparatus are not utilized to control the movement and direction of travel of poppet 20.

The tapered aerodynamic shape of the poppet 20 and configuration of the check valve of the invention produces a minimal pressure drop when water flows over the poppet 20. A typical pressure drop associated with the check valve of the invention is in the range of only eight to ten psi.

Existing conventional check valves are unstable during the forward flow condition; the poppet in the valves tends to move and "bang" around. In contrast, such conventional valves tend to be stable when the poppet is in position during back flow conditions.

In pump applications, check valves are utilized to prevent back flow through pumps when the pumps are not operating. In such applications, conventional check valves often tend to wear out and become inoperable after about only two years, or sooner. A check valve configured in accordance with the invention has an operational life that is significantly longer.

Having set forth my invention and the presently preferred embodiments and uses thereof, I claim:

1. A check valve assembly to direct the flow of a fluid, the fluid having a specific gravity, said assembly including
 (a) a housing (12) including an arcuate inner surface having a width;
 (b) a cylindrical outlet conduit (13) extending into said housing and having an end with
  (i) a first planar seating surface (17), and
  (ii) a first inner cylindrical diameter less than said width of said housing;
 (c) at least one outflow aperture (26, 27) formed in said outlet conduit within said housing a selected distance from said first planar seating surface;
 (d) a cylindrical inlet conduit connected to said housing and having an end with
  (i) a second planar seating surface (16) spaced apart from said first seating surface, and
  (ii) a second inner cylindrical diameter less than said width of said housing;
 (e) a poppet (20) mounted in said housing and including
  (i) a body including
   a first side with a third planar seating surface (30) shaped to conform to said first seating surface,
   a second side with a fourth planar seating surface (31) shaped to conform to said second seating surface, and
   a width extending between said first and second sides, and
  (ii) a first arm
   having a length greater than said width of said body and less than said selected distance of said outflow aperture (26, 27) from said first planar seating surface,
   extending and tapering outwardly from said first side and having a substantially conical outer guide surface,
   having a base having a diameter slightly less than said inner diameter of said outlet conduit to center poppet in said end of said outlet conduit, and
   having a distal tip spaced outwardly apart from said base,
  (iii) a second arm
   having a length greater than said width of said body,
   extending and tapering outwardly from said second side and having a substantially conical outer guide surface,
   having a base having a diameter slightly less than said inner diameter of said inlet conduit to center said poppet in said end of said inlet conduit, and
   having a distal tip spaced outwardly apart from said base, said poppet
   having a specific gravity substantially equivalent to the specific gravity of the fluid,
   continuously spaced apart from and not contacting said arcuate inner surface of said housing,
   moving between at least two operative positions,
  (i) a first operative open position with
   said poppet centered in said end of said outlet conduit,
   said distal tip of said first arm positioned between said outflow aperture and said end of said outlet conduit and not extending to said outflow aperture so that fluid flows from said inlet conduit and into said outlet conduit without contacting and flowing over said first arm, and
   said third seating surface sealingly contacting said first seating surface to permit fluid flowing into said housing from said inlet conduit to flow around said poppet, into said outflow aperture, and outwardly through said outlet conduit, and
  (ii) a second operative position with
   said poppet centered in said end of said outlet conduit, and
   said fourth seating surface sealingly contacting said second seating surface to prevent fluid from back flowing from said housing into said inlet conduit.

* * * * *